Patented July 8, 1924.

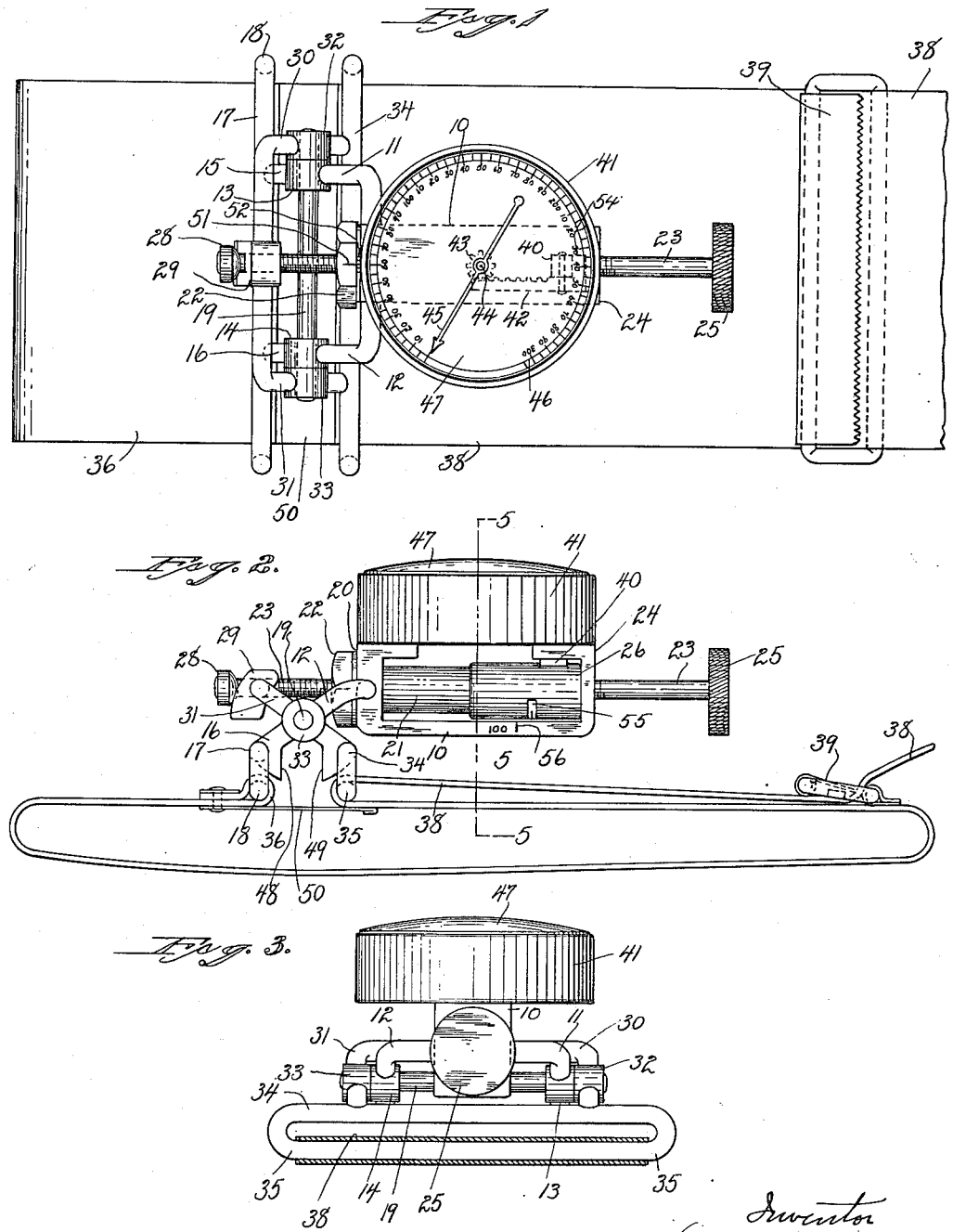

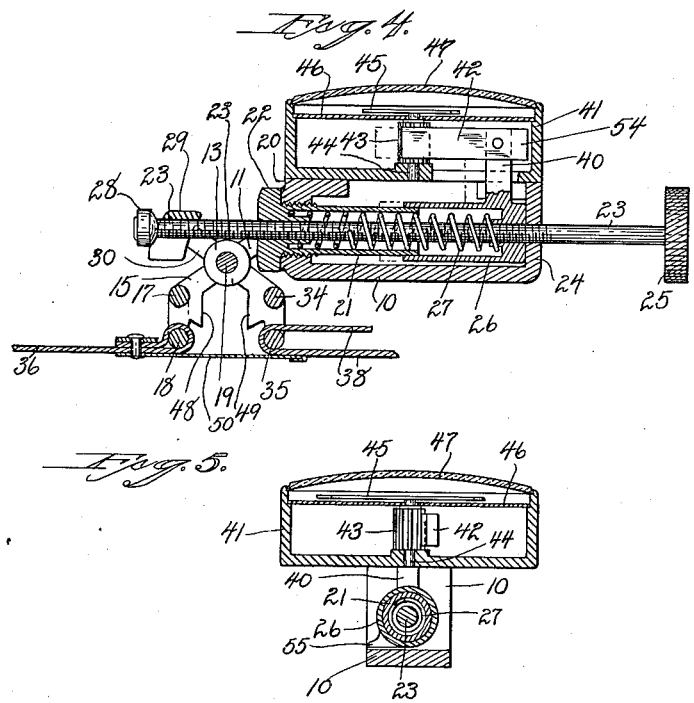
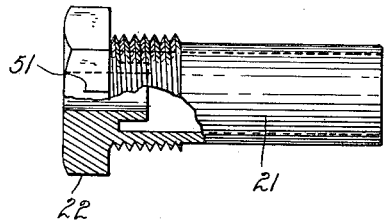
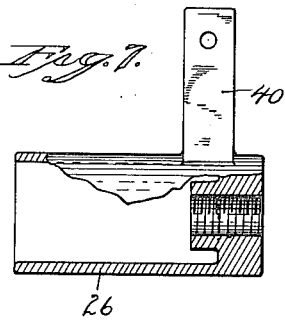
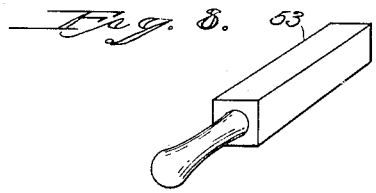

1,500,629

UNITED STATES PATENT OFFICE.

LOUIS H. LEVY, OF NEW HAVEN, CONNECTICUT.

SPHYGMOMANOMETER.

Application filed November 14, 1923. Serial No. 674,683.

*To all whom it may concern:*

Be it known that I, LOUIS H. LEVY, a citizen of the United States, residing at New Haven, in the county of New Haven and State of Connecticut, have invented a new and useful Improvement in Sphygmomanometers; and I do hereby declare the following, when taken in connection with the accompanying drawings and the characters of reference marked thereon, to be a full, clear, and exact description of the same, and which said drawings constitute part of this application, and represent, in—

Fig. 1 a plan view of a sphygmomanometer constructed in accordance with my invention.

Fig. 2 a side view of the same.

Fig. 3 an end view of the same.

Fig. 4 a longitudinal sectional view of the same.

Fig. 5 a sectional view on the line 5—5 of Fig. 2.

Fig. 6 a side view, partly in section, of the sleeve detached.

Fig. 7 a side view, partly in section of the slide detached.

Fig. 8 a perspective view of the spacing-block.

This invention relates to improvement in sphygmomanometers. In the more general construction of sphygmomanometers, they comprise an arm-band carrying an air-bag which is fastened around the arm and adapted to be inflated and a manometer, either mercury or aneroid, but in such devices, the band is usually a long one and must be wrapped about the arm several times to secure its hold, and difficulty is experienced in properly adjusting the band, if the arm is of unusual proportions. In order to secure accuracy, there must be a complete circumferential pressure about the entire arm, and when the arm is fat, this is impossible, as the air-bag portion is too short, or, if made long enough for such purposes, it is too long when applied to a thin arm and causes too much overlapping. Furthermore, carelessness in wrapping the band about the arm will cause inaccurate reading. In the use of rubber-bag arm-bands, the rubber ultimately loses its elasticity and consequently fails to function properly. Furthermore, with inflatable arm-bands, trouble has been experienced, due to valves of the air-pumps not working properly, as these valves include a small spring, which is liable to get out of order. In the use of mercury in manometers, the glass reservoirs and its arms are liable to break, and rubber connection to the glass reservoir will deteriorate, and as mercury may adhere to the sides of the tubes, there will be an error at the reading-point, while, with an aneroid manometer, there is liable to be a change in diaphragm tension after much use; the hair-spring controlling the hand is subject to changes; the hand will fluctuate during dial readings, and consequently is not always reliable, and the reading on the dial, due to its position, is not always easy. The object of this invention is to provide a sphygmomanometer which has no rubber parts, requires no mercury, diaphragm arrangement, fine springs, or fluctuating hand and which will give an easy reading up and down the scale, can be easily fitted to any size of arm, and gives even constriction about the arm; which may be adjusted for correcting inaccuracies, and which is compact for portability, and the invention consists in the construction as hereinafter described and particularly recited in the claims.

In carrying out my invention, I employ a cast-metal frame 10, formed at its forward end with forwardly-projecting V-shaped arms 11 and 12, forming, at their points, knuckles 13 and 14, and terminating in lower ends 15 and 16 formed integral with or secured to the upper bar 17 of a loop 18. The knuckles are mounted on a transverse pin 19. Threaded into the front wall 20 of the casing 10 is a tubular sleeve 21, formed with a head 22, and extending through this sleeve is a stem 23, which extends through the rear wall 24 of the casing and is provided at its end with a knurled operating-button 25, and this stem has threaded connection with a tubular slide 26 mounted within the casing and adapted to telescope over the inner end of the sleeve 20, and between the sleeve and slide, around the stem, is a spring 27. The end of the stem is provided with a stop 28, and on the stem is a yoke 29 formed with V-shaped arms 30 and 31 and with knuckles 32 and 33, corresponding to the knuckles 13 and 14, and through which the pin 19 extends. The arms 30 and 31 are formed integral with or attached to the upper bars 34 of loops 35. One end 36 of a band is connected with the lower bar of the loop 18, while the free end 38 of the band passes through the loop 35 and is engaged with the main body of the band, by a buckle 39. The slide 26 is formed with an upwardly-extending post 40, which projects into a housing 41 mounted on the casing 10, and this post carries a longitudinally-movable rack-arm 42, meshing with a pinion 43 fixed to a vertically-arranged shaft 44 carrying, at its upper end, a pointer 45 adapted to sweep over a graduated dial 46, which is covered by a protective, transparent cover 47. The rack has an offset end 54 which is permanently secured to the post 40, whereby it is held against lateral or vertical movement. The inner faces of the arms 15 and 31 are respectively formed with abutment faces 48 and 49, for the purpose as will hereinafter appear, and secured to the inner face of the fixed end of the band is a pressure-plate 50, which is of a length to extend beneath the loop 18. Preferably, the head 22 will have a mark 51 to register with a scale 52 on the adjacent face of the casing.

In use, the band is placed around the arm and drawn to the desired tension, the plate 50 resting over an artery. The stem 23 is then turned by its button 25 so as to move the slide 26 forward, against the tension of the spring 27, and in moving this slide, moves the rack 42 so as to cause the pointer 45 to sweep over the dial and indicate the pressure, and when the pressure is sufficient to stop the pulse, as determined in the usual way, the dial will give the correct reading of the blood-pressure, and such reading must necessarily be accurate.

To test the device, I provide a spacing-block 53, as shown in Fig. 8 of the drawings, which may be placed between the abutments 48 and 49, and the stem 13 turned until these abutments bear upon the block, and the position of the mark 51 may be noted relative to the scale 52, so that provision is made for the correction of any inaccuracies due to wear.

Furthermore, I provide the slide with a point 55 and the edge of the frame with a mark 56, so that when the block is placed between the abutments and the stem turned inward until the point 55 registers with the mark 56, the pointer 45 should register 100 on the dial. If this does not so register, the head 22 will be turned in one direction or the other, to cause the pointer 45 to register 100, and thus assure that the device will accurately register blood-pressure. If the head is adjusted, the operator may make a note of the reading on the scale 52 and so be able, at a glance, to see whether or not the mechanism has been changed since the last testing.

I thus provide a device for the purpose specified, which avoids the objections to devices now in use and provides a device which may be used with convenience, which is not liable to become broken or disarranged, which provides for convenient reading and is simple and compact in construction.

I claim:

1. A sphygmomanometer, comprising an arm-band, two arms connected respectively to the ends of said band, means pivotally mounting said arms, a casing with which one arm is rigidly secured, a screw-stem slidably mounted in said casing, means operatively connecting said stem with the other arm, a slide in said casing and adapted to be actuated by movement of said stem, and indicating means associated with said slide whereby tension applied to said band will be indicated by said indicating means.

2. A sphygmomanometer, comprising an arm-band, two arms connected respectively to the ends of said band, means pivotally mounting said arms, a casing with which one arm is rigidly secured, a sleeve mounted in said casing, a screw-stem slidably mounted in said sleeve, means operatively connecting said stem with the other arm, a slide in said casing and adapted to be actuated by movement of said stem, a spring between said sleeve and slide, and indicating means associated with said slide whereby tension applied to said band will be indicated by said indicating means.

3. A sphygmomanometer, comprising an arm-band, two arms connected respectively to the ends of said band, means pivotally mounting said arms, a casing with which one arm is rigidly secured, a sleeve mounted in said casing, a screw-stem slidably mounted in said sleeve, means operatively connecting said stem with the other arm, a tubular slide also mounted in said casing and telescoping with the inner end of said sleeve and adapted to be actuated by movement of said stem, a spring between said sleeve and slide, and indicating means associated with said slide whereby tension applied to said band will be indicated by said indicating means.

4. A sphygmomanometer, comprising an arm-band, two arms connected respectively to the ends of said band, means pivotally mounting said arms, a casing with which one arm is rigidly secured, a screw-stem slidably mounted in said casing, means operatively connecting said stem with the other arm, a slide in said casing and adapted to be actuated by movement of said stem, a pressure plate secured to the band beneath said arms, and indicating means associated with said slide whereby tension applied to said band will be indicated by said indicating means.

5. A sphygmomanometer, comprising an arm-band, two arms connected respectively to the ends of said band, means pivotally mounting said arms, a casing with which one arm is rigidly secured, a screw-stem slidably mounted in said casing, means operatively connecting said stem with the other arm, a slide in said casing and adapted to be actuated by movement of said stem, a housing mounted on top of said casing, said slide being formed with a post projecting into said housing, a rack carried by said post, a pinion meshing with said rack, a dial in the housing, and a pointer carried by said pinion adapted to indicate over the face of said dial.

6. A sphygmomanometer, comprising an arm-band, two arms connected respectively to the ends of said band, means pivotally mounting said arms, a casing with which one arm is rigidly secured, a screw-stem slidably mounted in said casing, means operatively connecting said stem with the other arm, a slide in said casing and adapted to be actuated by movement of said stem, and bearing a mark registering with a scale on the casing, and indicating means associated with said slide whereby tension applied to said band will be indicated by said indicating means.

In testimony whereof, I have signed this specification in the presence of two subscribing witnesses.

LOUIS H. LEVY.

Witnesses:
FREDERIC C. EARLE,
MALCOLM P. NICHOLS.